United States Patent
Pacheco et al.

(10) Patent No.: US 11,521,156 B2
(45) Date of Patent: Dec. 6, 2022

(54) TRUSTABLE PRODUCT DELIVERY WITH RFID AND SMART CHIP

(71) Applicant: International Business Machines Corporation, Armonk, NY (US)

(72) Inventors: Daniel Pacheco, Austin, TX (US); Vijender Koorella, Austin, TX (US); Ching-Yun Chao, Austin, TX (US); Richard Daniel Gunjal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 16/738,534

(22) Filed: Jan. 9, 2020

(65) Prior Publication Data
US 2021/0216958 A1    Jul. 15, 2021

(51) Int. Cl.
| | |
|---|---|
| *G06Q 10/08* | (2012.01) |
| *H04L 9/06* | (2006.01) |
| *G06K 19/077* | (2006.01) |

(52) U.S. Cl.
CPC ... *G06Q 10/0833* (2013.01); *G06K 19/07758* (2013.01); *H04L 9/0643* (2013.01)

(58) Field of Classification Search
CPC ............... G06Q 10/0833; G06K 19/07758
USPC ........................................................ 705/330
See application file for complete search history.

(56) References Cited

U.S. PATENT DOCUMENTS

| 8,967,458 | B1* | 3/2015 | Hanlon ............... G06Q 10/00 235/375 |
| 9,641,338 | B2 | 5/2017 | Sriram et al. |
| 9,830,604 | B2 | 11/2017 | Aljawhari |
| 10,129,035 | B2 | 11/2018 | Gulati |
| 2005/0006469 | A1 | 1/2005 | Nonneman et al. |
| 2006/0054705 | A1* | 3/2006 | Garton ............... G06Q 10/08 340/572.1 |
| 2007/0273507 | A1* | 11/2007 | Burchell ............... G01K 3/04 340/572.1 |
| 2009/0020442 | A1* | 1/2009 | Dietrich ............... G06K 7/0008 206/232 |
| 2012/0128157 | A1* | 5/2012 | Braun ............... G06F 21/445 380/270 |

(Continued)

OTHER PUBLICATIONS

IP.com search.*

(Continued)

*Primary Examiner* — Allyson N Trail
(74) *Attorney, Agent, or Firm* — Edward P. Li

(57) ABSTRACT

Trustable delivery of a product uses a package with a printed label having a unique product ID, an RFID marker applied to the product that contains the ID, and a smart chip inside the product that contains the ID and a digital key. The ID from the RFID marker is compared to the label for initial validation of the package. The smart chip is further interrogated to generate an encoded value of the ID, such as a hash value, using the digital key. The hash value is then used to authenticate the ID, thereby verifying that the product as delivered is the original, untampered product. The product ID and the hash value are recorded in a blockchain ledger associated with the product. In this manner, the packaged product can be validated by any party in the delivery chain, e.g., manufacturer, seller, distributor, delivery service, and final recipient.

20 Claims, 8 Drawing Sheets

(56) References Cited

U.S. PATENT DOCUMENTS

| | | | |
|---|---|---|---|
| 2016/0055560 A1 | 2/2016 | McKelvey | |
| 2016/0055562 A1* | 2/2016 | Kim | H04W 4/80 |
| | | | 705/26.61 |
| 2018/0012311 A1 | 1/2018 | Small | |
| 2018/0061162 A1 | 3/2018 | High et al. | |
| 2018/0137503 A1 | 5/2018 | High et al. | |
| 2018/0189730 A1 | 7/2018 | Wilkinson et al. | |
| 2018/0232693 A1 | 8/2018 | Gillen et al. | |
| 2018/0240183 A1 | 8/2018 | Tiilikainen | |
| 2019/0114584 A1 | 4/2019 | Toohey et al. | |
| 2019/0120929 A1 | 4/2019 | Meadow | |
| 2021/0142631 A1* | 5/2021 | Bella | G08B 13/2448 |
| 2021/0216958 A1* | 7/2021 | Pacheco | G06K 19/0723 |
| 2021/0253280 A1* | 8/2021 | Colson | B29C 70/688 |

OTHER PUBLICATIONS

Blockchain in Transport Alliance, "Driving Standards and Enabling Technology Adoption" [online], retrieved on Dec. 10, 2019 from the Internet URL: https://www.bita.studio/ (2019).

Chamlou, Nina, "Alibaba launches blockchain initiative to track food delivery" [online] Air Cargo World, retrieved on Dec. 10, 2019 from the Internet URL: https://aircargoworld.com/allposts/alibaba-launches-blockchain-initiative-to-track-food-delivery/ (May 1, 2018).

De Meijer, Carlo, "Blockchain and package tracking: a win-winsituation!" [online], retrieved on Dec. 10, 2019 from the Internet URL: https://www.finextra.com/blogposting/14167/blockchain-and-package-tracking-a-win-win-situation (Jun. 11, 2017).

DHL, "Blockchain in Logistics" [online], retrieved on Dec. 10, 2019 from the Internet URL: https://www.logistics.dhl/content/dam/dhl/global/core/documents/pdf/glo-core-blockchain-trend-report.pdf (2018).

Milton, Lawrence, "Following fraudulent claims, Amazon revises delivery system" [online] The Times Of India, retrieved on Dec. 10, 2019 from the Internet URL: https://timesofindia.indiatimes.com/city/mysuru/following-fraudulent-claims-amazon-revises-delivery-system/articleshow/63757096.cms (Apr. 14, 2018).

Shipchain, "The End-To-End Logistics Platform of the Future: Trustless, Transparent Tracking" [online], retrieved on Dec. 10, 2019 from the Internet URL: https://shipchain.io/ (2019).

Tatham, Matt, "Russian Hackers Aren't the Only Ones to Worry About: Online Shopping Fraud Report" [online], retrieved on Dec. 10, 2019 from the Internet URL: https://www.experian.com/blogs/ask-experian/the-state-of-online-shopping-fraud/ (Apr. 13, 2018).

Theconversation, "How Blockchain Technology Could Transform the Food Industry" [online], retrieved on Dec. 10, 2019 from the Internet URL: https://www.ecowatch.com/blockchain-technology-2519373206.html (Dec. 22, 2017).

US Census Bureau, "Quarterly Retail E-Commerce Sales 2nd Quarter 2019" [online], retrieved on Dec. 10, 2019 from the Internet URL: https://www.census.gov/retail/mrts/www/data/pdf/ec_current.pdf (Aug. 19, 2019).

Winnesota, "How Blockchain Is Revolutionizing The World Of Transportation And Logistics" [online], retrieved on Dec. 10, 2019 from the Internet URL: https://www.winnesota.com/blockchain (2019).

* cited by examiner

TRUSTABLE PRODUCT DELIVERY WITH RFID AND SMART CHIP

BACKGROUND OF THE INVENTION

Field of the Invention

The present invention generally relates to order fulfillment, and more particularly to a method of shipping or delivery which ensures the integrity of the shipped product.

Description of the Related Art

As more and more shoppers are making purchases online via the Internet, there has been a dramatic increase in shipping and delivery requirements. Many companies that previously only had brick-and-mortar stores (i.e., physical storefronts with no Internet presence) have added online shopping capabilities, and there is in particular an increased demand for expedited shipping, such as same-day or one-day delivery.

As this demand rises, there has also been an increase in problems with customers receiving their goods as intended. These problems range from innocent mistakes in the shipping and delivery processes to intentional acts of theft or vandalism. For example, there has been a growing number of so-called "porch pirates" who steal packages left at a recipient's doorstep. There are many approaches to ensuring proper delivery in spite of these occurrences. One of the most common approaches is to get a recipient to sign-off when a package is delivered, but even this basic precaution has problems. Sometimes a recipient is not at home at the time of delivery, and the package must be re-delivered at a later date. It is also possible that someone at the house or other delivery location is not actually authorized to receive the package but signs the delivery receipt anyway, and then conceals the delivery from the actual recipient.

Even if a package is delivered, it may have already been handled by someone with nefarious intent. Many methods have consequently been devised to ensure the integrity of a packaged product. One simple approach is the use of tamper proof seals, etc., which prevent a package from being opened without it becoming apparent that the package has been compromised. Another approach is to apply a magnetic strip or other electronic tag to the product, inside the packaging, which has imbedded therein a product or shipping code. In this manner, when a product is delivered, the delivery person can check the tag using an electronic reader without opening the package but still confirm that the product inside is authentic.

A more recent approach for monitoring the shipping and delivery of products employs blockchain technology. Blockchain uses a series of records, called blocks, that are linked using cryptography. Each block contains a cryptographic hash of the previous block, a timestamp, and transaction data. This type of recordkeeping allows continuity in recording related transactions while maintaining the integrity of the records. This approach thus allows products to be tracked end-to-end, from manufacturer to end user.

SUMMARY OF THE INVENTION

The present invention in at least one embodiment is generally directed to a method for trustable delivery of a product using a package with a printed label having a product identifier that is uniquely associated with the product, an electronic tag applied to the product that contains the product identifier, and a smart chip located inside the product that contains the product identifier and a digital key supplied by, e.g., the manufacturer of the product. The electronic tag is read to obtain the sealed product identifier which can be compared to that printed on the label for an initial validation of the package. The electronic tag may for example be a radio-frequency identification marker. The smart chip can further be interrogated to generate an encoded value of the product identifier using the digital key. The encoded value can be a hash function of the product identifier. The encoded value can then be used to authenticate the product identifier, thereby verifying that the product as delivered is the original product so packaged. In the exemplary implementation, the product identifier and the encoded value are recorded in a blockchain ledger associated with the product. In this manner, the packaged product can be validated by any party in the delivery chain, e.g., manufacturer, seller, distributor, delivery service, and final recipient. The smart chip preferably allows only a single write of the product identifier and only a single write of the digital key to prevent later modification of this information. The encoded value can optionally be included with the electronic tag and printed on the package label.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

DESCRIPTION OF THE PREFERRED EMBODIMENT(S)

Online shopping fraud is costly and is on the rise. Fraud in the delivery chain for online shopping can happen from suppliers, deliverers, and buyers. The more expensive a package is, the more lucrative fraud becomes. Sellers can deliver fake and defective products. Deliverers can switch the product for a fake or damaged version during the delivery process. And customers can receive the product, and then file refund claims saying that they did not actually receive it.

Some major online retailers have been resorting to forcing their deliverers to open product packaging and take photos of the product they are about to deliver in some markets. Such a system is cumbersome and easily manipulated. There is no effective way to ensure the quality and delivery of the purchased product. It would, therefore, be desirable to devise an improved method for making the online shopping process a more trustable experience for the customer. It would be further advantageous if the method could reliably track a product from end-to-end, i.e., manufacturer to end user.

These and other advantages are achieved in various implementations of the present invention by providing a product packaging that includes an electronic tag, such as a magnetic strip or radio-frequency identification marker having a unique product identifier written thereon, and a smart chip included with the product which also contains the product identifier as well as a digital key that is used to generate an encoded value based on the product identifier. At anywhere along the delivery chain, the package can be scanned to read the electronic tag and confirm that the product identifier matches that printed on a label of the package. The smart chip can be further interrogated to retrieve the encoded value, which provides separate authentication of the product identifier. In the preferred implementation, blockchain technology is used create a record which includes both the product identifier and the encoded value. In this manner, the packaged product can be tracked from manufacturers all the way to buyers with accurate, quality and trustable delivery.

Figure 1:
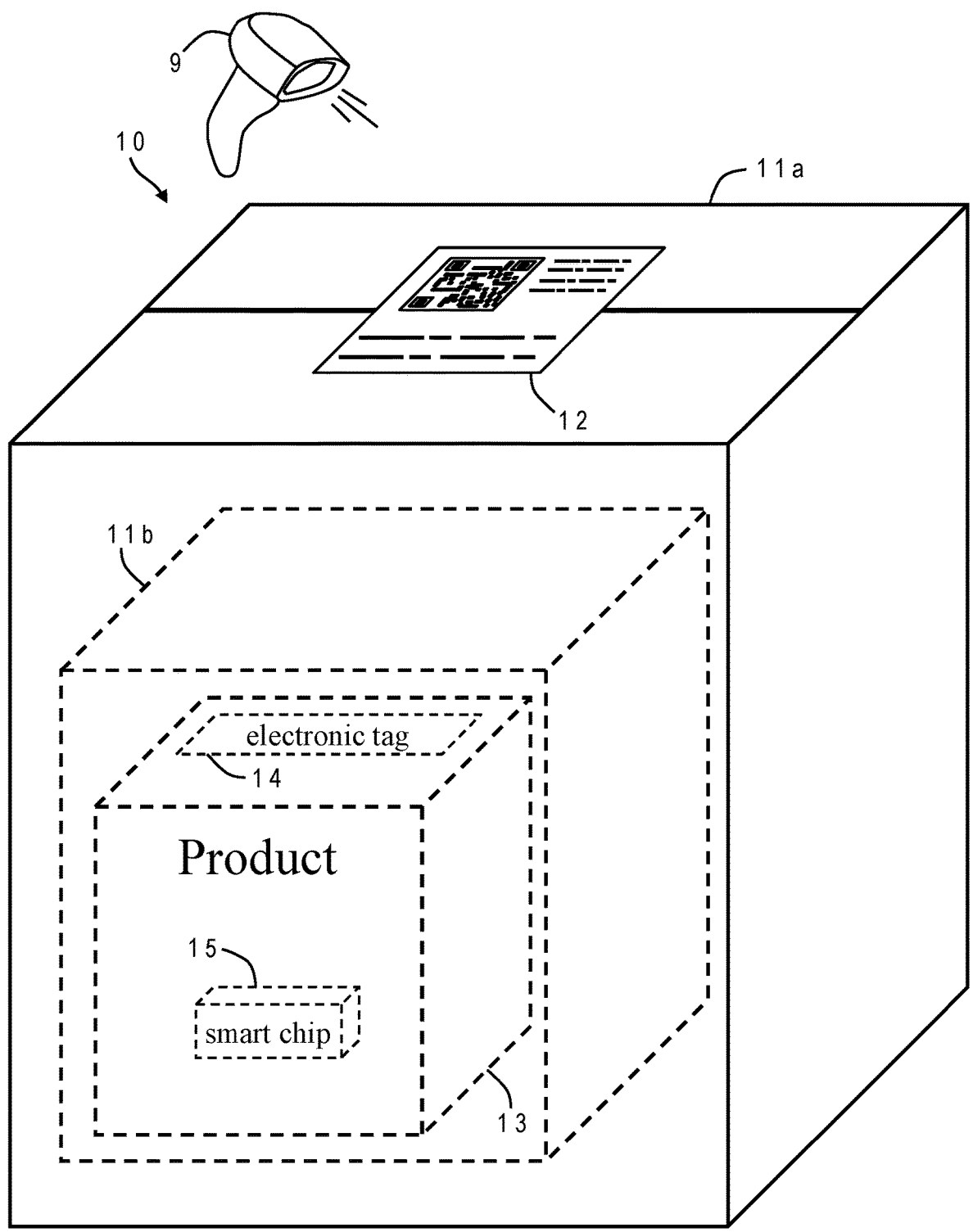
FIG. 1 is a perspective view of a product packaged for delivery in accordance with one implementation of the present invention, including an electronic tag attached to the product and a smart chip inside the product.

With reference now to the figures, and in particular with reference to FIG. 1, there is depicted one embodiment 10 of a product packaging constructed in accordance with the present invention. Product packaging 10 is generally comprised of an outer package 11a having a printed label 12 thereon and an inner package 11b having the product 13 therein. Outer and inner packages 11a, 11b may be constructed of any conventional materials such as cardboard, plastic, paperboard, biopolymers, wood, etc., or some combination thereof, and their walls are sufficiently thick to impart structural stability and withstand light damage. In this embodiment outer and inner packages 11a, 11b are rectangular cuboid but they could be of any shape, including other polyhedrons as well as curved surfaces. The only requirement is that they be of appropriate size and shape to substantially contain the product. Outer and inner packages 11a, 11b may be sealed using packaging tape or other means such as sonic welding or heat sealing. Sealing product packaging 10 makes it harder for malicious users to steal a product or replace it with a counterfeit. In the exemplary implementation, product 13 is sealed inside inner package 11b by the manufacturer or other source of product 13, and inner package 11b is thereafter sealed inside outer package 11a by, e.g., a shipping service who is going to deliver product packaging 10.

Product 13 has applied thereto an electronic tag 14. Electronic tag 14 may be any of varying designs which allow for the remote (wireless) reading of information stored on the tag. In this case the information is a product identifier (ID) uniquely labeling product 13, i.e., not simply a generic ID for the type of product but an identifier that is associated with this specific product. The product ID can be assigned by the manufacturer when the product is assembled. For example, the product ID could be a serial number, but the product ID is not limited to digits only as it could include alphabetical or special characters; all that is required is that the product ID be formatted in such a way that it can be appropriately read by a conventional electronic reader. Manufacturers can seal the tag inside the product package box. For example, electronic tag 14 could be a magnetic strip having adhesive on one side which adheres to product 13, or it could be a radio-frequency identification (RFID) marker attached to the product using a fastener, preferably removable. An RFID marker could be passive (temporarily absorbing electrical energy from a nearby electronic reader's radio waves) or active (having a local power source such as a battery). In this manner, anyone involved in the shipping/delivery process can use the electronic reader to scan the tag and retrieve the product ID without having to open product packaging 10.

The same product ID written on electronic tag 14 is also printed on label 12 in human-readable form, machine-readable form, or both. In the illustrative implementation the product ID is printed using normal characters and additionally as a quick response (QR) code consisting of black squares arranged in a square grid on a white background. QR codes are generally known and are one of many optical encoding techniques that may be used. Other optical encoding techniques include bar codes, QR code variants such as IQR code, and color encoding such as JAB. Label 12 may have other printed information like the shipper/origin, the recipient name and location, or other shipping-related data.

The visual indication of the product ID on the printed label 12 offers an opportunity to quickly check the integrity of product packaging 10 by reading the product ID from electronic tag 14 and comparing it to printed label 12. This comparison may be performed manually or using an electronic reader 9 or other specialized computing device that can both scan the RFID marker and read the QR code. If the ID from the RFID marker does not match the ID from the label (or if either of the two IDs cannot be read for any reason), the person inspecting the packaging can conclude that it has been tampered with. If the two IDs are the same, the match provides a preliminary indication that the packaging and product are still intact. This validation can be performed by anyone along the shipping/delivery chain including the manufacturer, a distributor, a delivery service, and the final recipient.

Those skilled in the art will appreciate that this embodiment 10 of the product packaging is only one example of how the present invention may be practiced and should therefore not be construed in a limiting sense. For example, inner package 11b not necessary to practice the most useful aspects of the present invention The electronic tag allows distributors, online stores, and delivery companies to verify against the QR code on the outside box. The use of QR code and electronic tag makes it hard to replace a product by a fake without breaking the packaging. However, breaking the seal, replacing the product, and then resealing the packaging is doable without excessive cost. Moreover, the above methods essentially bind a unique identification code to a package, and not to the product per se. Additional validation of the packaging integrity can be achieved by means of a smart chip 15 or similar device located inside product 13. Smart chips are generally known in the art. A smart chip is a small piece of hardware (an integrated circuit) that includes microprocessor functionality for computing, i.e., one or more execution units that carry out stored program instructions, or other resources for high-level data handling. Smart chip 15 is interrogable, that is, it can be activated by an electromagnetic control signal to initiate its functionality which, in this invention, is to generate an encoded output value. In the preferred embodiment smart chip 15 is self-powered using a battery that need only have a relatively short lifetime since the chip is only used for delivery, i.e., it is unnecessary once the product has been received by the end user.

Figure 2:
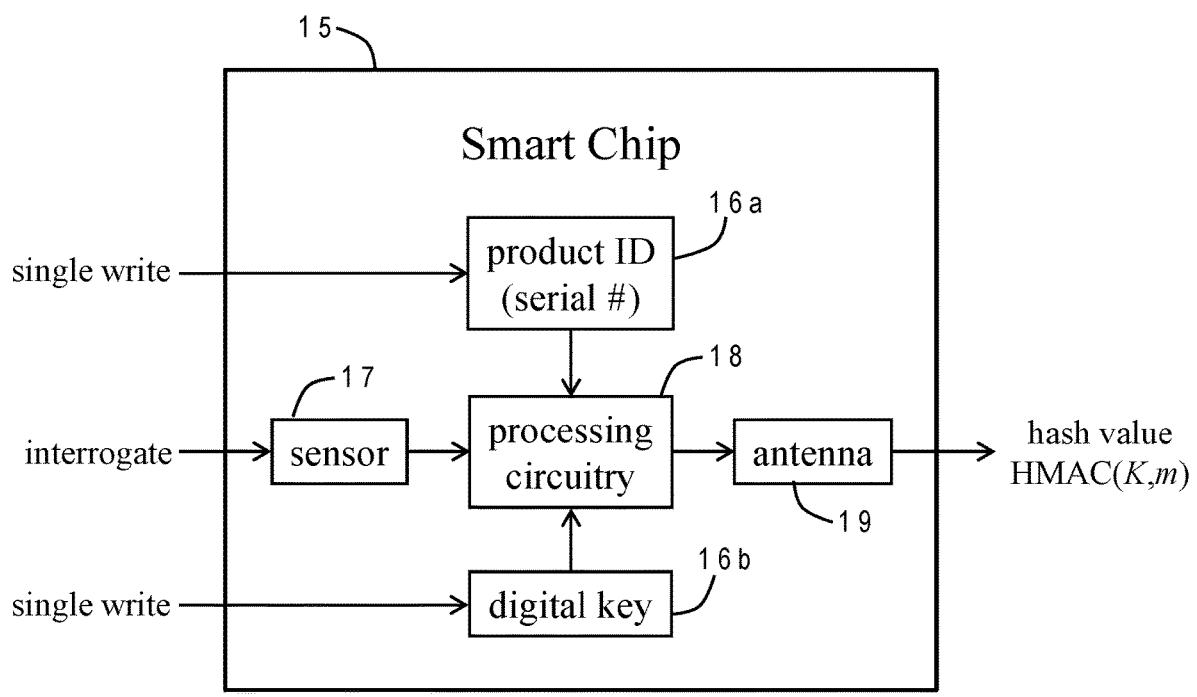
FIG. 2 is a lock diagram of a smart chip constructed in accordance with one implementation of the present invention which generates an encoded (hash) value using a product identifier (ID) and a digital key.

One embodiment of smart chip 15 is shown in FIG. 2. Smart chip 15 includes at least a first memory cell 16a which contains the product ID and a second memory cell 16b which contains a secret digital key. Smart chip 15 is designed to allow only a single write of the product ID to first memory cell 16a and only a single write of the digital key to the second memory cell 16b. For example, the smart chip can have a user interface that accepts a product ID string as input and stores and seals it inside the chip, e.g., a function importProductId(String productIdentifier) that can be programmed exactly once to read in a product ID. A manufacturer will generate the digital key, e.g., randomly, and then program the key into the smart chip, as well as storing the unique product ID in the smart chip. The manufacturer maintains the secrecy of the digital key. There is no user interface (application program interface) or input/output pins on smart chip 15 to change the digital key or the product ID afterwards. Essentially the digital key and product ID are stored and sealed in the smart chip. Smart chip 15 uses the digital key to generate an encoded value based on the product ID. In the exemplary embodiment, smart chip 16 use a function like the hash-based message authentication code (HMAC) to generate the encoded value. This type of encoding is generally known, and is defined as HMAC(K, m) where K is the secret key (here, the digital key stored in memory cell 16b) and m is the message to be encoded (here, the product ID stored in memory cell 16a). This hashed value can be used as an additional product label or stamp which will be stored in all transaction records in a blockchain ledger to track the product from manufacturing to delivery, as explained further below in conjunction with FIG. 4. Thus, anyone along the delivery chain can interrogate smart chip 15 using an appropriate reader via its input sensor 17 which activates the processing circuitry to generate the encoded value and provide it to an output antenna 19.

This approach binds the unique product identifier directly to a product rather than just the packaging. The smart chip (including battery) is assembled inside the product by the manufacturer in such a way that the smart chip cannot be physically accessed without breaking an exterior of the product. If the product is electronic in nature with at least one circuit board, the smart chip can be soldered onto the product circuit board to make it much harder to replace. For example, many modern computers already embed a trusted platform module (TMP) chip on the motherboard. The smart chip can thus be readily integrated into or a part of the TPM. However, the chip can still be built into non-electronic products in various ways, such as by embedding the smart chip within a construction material of the product such as a polymer or epoxy resin. The manufacturer maintains a list of product identifiers and corresponding encoded values.

Figure 3:
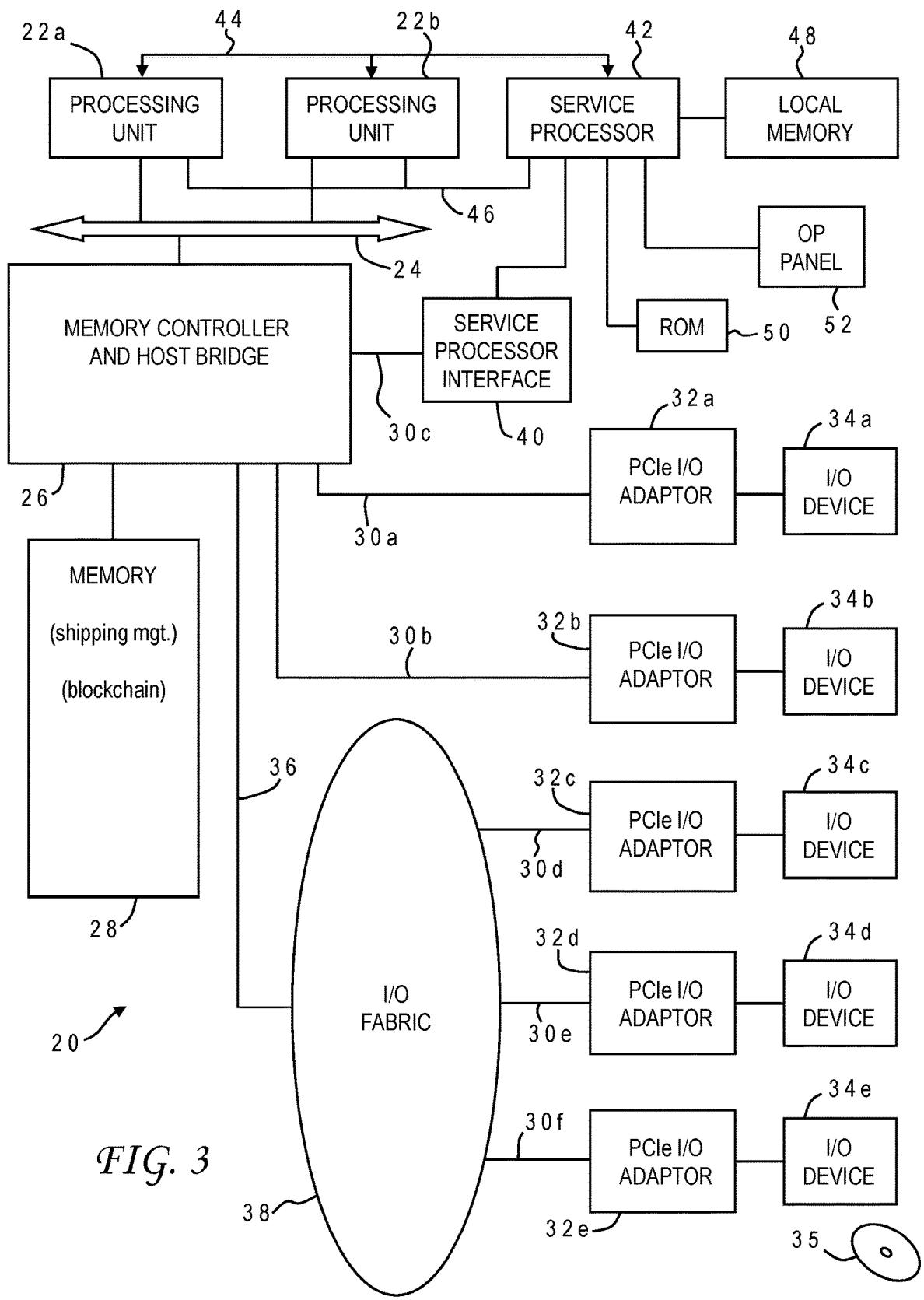
FIG. 3 is a block diagram of a computer system programmed to carry out delivery management and process blockchain data in accordance with one implementation of the present invention.

The hash code can be used to authenticate the product ID in a variety of manners. In the illustrative implementation, blockchain technology is used for the authentication. The blockchain recordkeeping can be carried out using an appropriately programmed computer system. One example of a suitable computer system 20 is seen in FIG. 3. Computer system 20 is a symmetric multiprocessor (SMP) system having a plurality of processors 22a, 22b connected to a system bus 24. System bus 24 is further connected to a combined memory controller/host bridge (MC/HB) 26 which provides an interface to system memory 28. System memory 28 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 28 has loaded therein one or more applications in accordance with the present invention such as a shipping management program and a blockchain updating program.

MC/HB 26 also has an interface to peripheral component interconnect (PCI) Express links 30a, 30b, 30c. Each PCI Express (PCIe) link 30a, 30b is connected to a respective PCIe adaptor 32a, 32b, and each PCIe adaptor 32a, 32b is connected to a respective input/output (I/O) device 34a, 34b. MC/HB 26 may additionally have an interface to an I/O bus 36 which is connected to a switch (I/O fabric) 38. Switch 38 provides a fan-out for the I/O bus to a plurality of PCI links 30d, 30e, 30f. These PCI links are connected to more PCIe adaptors 32c, 32d, 32e which in turn support more I/O devices 34c, 34d, 34e. The I/O devices may include, without limitation, a keyboard, a graphical pointing device (mouse), a microphone, a display device, speakers, a permanent storage device (hard disk drive) or an array of such storage devices, an optical disk drive which receives an optical disk 35 (one example of a computer readable storage medium) such as a CD or DVD, and a network card. Each PCIe adaptor provides an interface between the PCI link and the respective I/O device. MC/HB 26 provides a low latency path through which processors 22a, 22b may access PCI devices mapped anywhere within bus memory or I/O address spaces. MC/HB 26 further provides a high bandwidth path to allow the PCI devices to access memory 28. Switch 38 may provide peer-to-peer communications between different endpoints and this data traffic does not need to be forwarded to MC/HB 26 if it does not involve cache-coherent memory transfers. Switch 38 is shown as a separate logical component but it could be integrated into MC/HB 26.

In this embodiment, PCI link 30c connects MC/HB 26 to a service processor interface 40 to allow communications between I/O device 34a and a service processor 42. Service processor 42 is connected to processors 22a, 22b via a JTAG interface 44, and uses an attention line 46 which interrupts the operation of processors 22a, 22b. Service processor 42 may have its own local memory 48, and is connected to read-only memory (ROM) 50 which stores various program instructions for system startup. Service processor 42 may also have access to a hardware operator panel 52 to provide system status and diagnostic information.

In alternative embodiments computer system 20 may include modifications of these hardware components or their interconnections, or additional components, so the depicted example should not be construed as implying any architectural limitations with respect to the present invention. The invention may further be implemented in an equivalent cloud computing network.

When computer system 20 is initially powered up, service processor 42 uses JTAG interface 44 to interrogate the system (host) processors 22a, 22b and MC/HB 26. After completing the interrogation, service processor 42 acquires an inventory and topology for computer system 20. Service processor 42 then executes various tests such as built-in-self-tests (BISTs), basic assurance tests (BATs), and memory tests on the components of computer system 20. Any error information for failures detected during the testing is reported by service processor 42 to operator panel 52. If a valid configuration of system resources is still possible after taking out any components found to be faulty during the testing then computer system 20 is allowed to proceed. Executable code is loaded into memory 28 and service processor 42 releases host processors 22a, 22b for execution of the program code, e.g., an operating system (OS) which is used to launch applications and in particular the blockchain application of the present invention, results of which (i.e., the blockchain ledger) may be stored in a hard disk drive of the system (an I/O device 34) or at a remote site, e.g., in a computing cloud, via a network adapter. While host processors 22a, 22b are executing program code, service processor 42 may enter a mode of monitoring and reporting any operating parameters or errors, such as the cooling fan speed and operation, thermal sensors, power supply regulators, and recoverable and non-recoverable errors reported by any of processors 22a, 22b, memory 28, and MC/HB 26. Service processor 42 may take further action based on the type of errors or defined thresholds.

Figure 4:
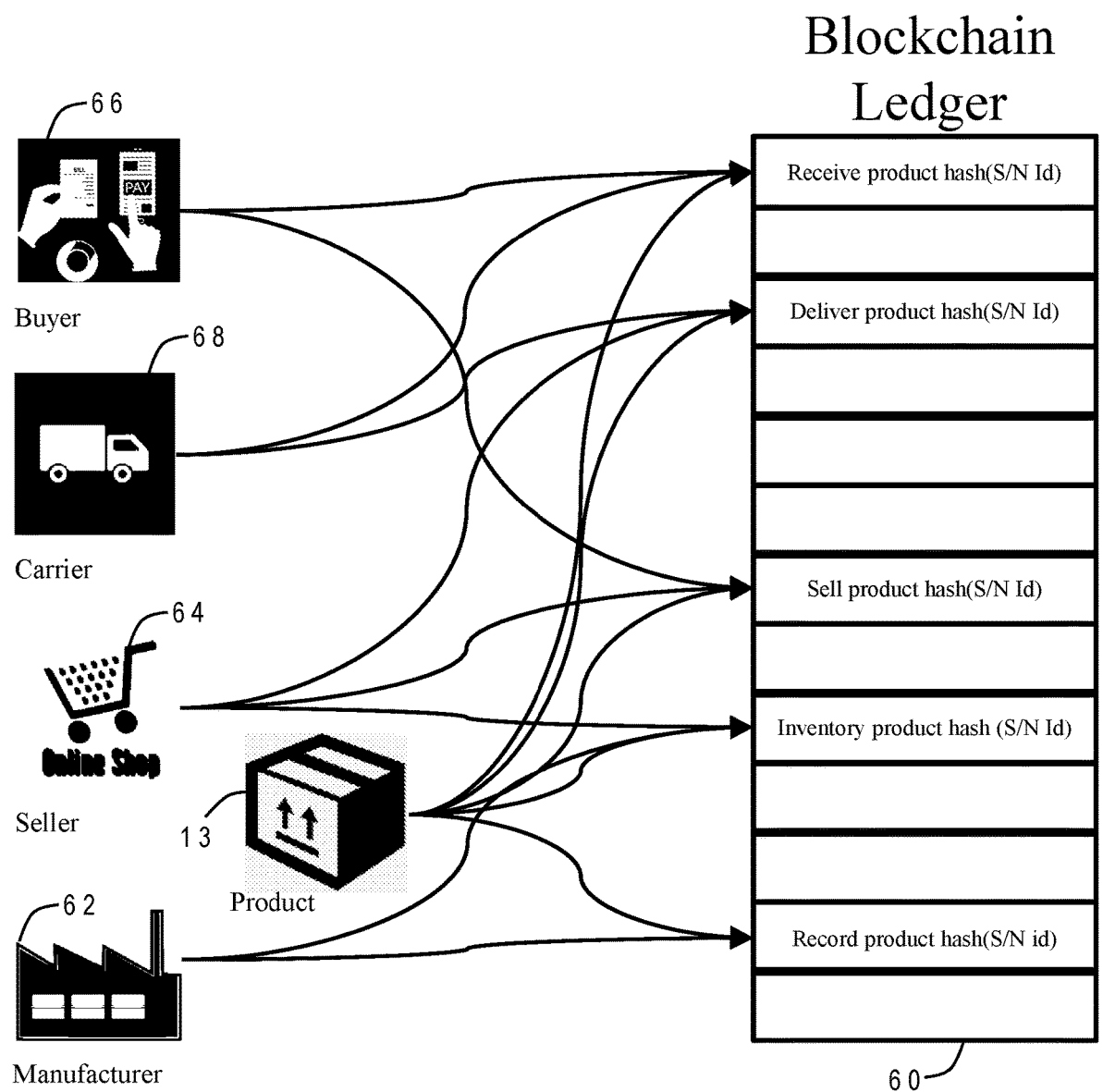
FIG. 4 is a pictorial representation of how a blockchain ledger can be built to track delivery of a product in accordance with one implementation of the present invention.

FIG. 4 illustrates an example of how a blockchain ledger 60 may be constructed using computer system 10 or similar systems as part of the delivery service in accordance with one implementation of the present invention. The process includes a manufacturer 62 who initially records the product hash in ledger 60, e.g., using the product's serial number and the digital key, when the product 13 is assembled or otherwise fabricated at the manufacturing site, including the embedded smart chip (this may or may not be the first block in the chain). This block (and each subsequent block) includes a timestamp as well as transaction data, so the manufacturer block represents a creation or recording transaction. A seller 64, such as an online retailer, adds another block with the product hash to indicate that the product has been moved to available inventory for sale. Either manufacturer 62 or seller 64 can apply the electronic tag to the product having the product ID. At each step, the current product hash (obtained from interrogating the smart chip in the product as described above) can be compared to the earlier product hash (in preceding blocks) to confirm the validity of the current transaction. As with all blockchain records, each block added to ledger 60 includes a cryptographic hash of the previous block to maintain trust.

A shopper 66 places an order for the product, and seller 64 enters another block in ledger 60 indicating that the product is being sold. As part of this interaction with the online shop presence, the shopper can also designate a special recipient code, discussed further below in conjunction with FIG. 6, or a recipient code can automatically be generated and sent to the shopper. The product is then handed off to the carrier 68 for delivery. When carrier 68 receives the product, and as part of the preparation for delivery, carrier 68 will enter another transaction block in ledger 60 indicating that delivery is underway. Either seller 64 or carrier 68 can finalize the product packaging similar to that shown in FIG. 1, including applying the visible QR code to the outside of the packaging. Finally, when the packaged product is delivered to the customer location, the delivery person can once again interrogate the smart chip and validate the completed delivery to the recipient, in addition to scanning the QR code to confirm the product ID, and another block is added to ledger 60 to reflect the delivery completion. The delivery transaction records can additionally include the package QR code (as well as the recipient QR code discussed below).

If at any point in this process a product hash is written to ledger 60 that does match the previous product hash, an indication is provided by the blockchain recordkeeping system that the product is no longer considered legitimate, i.e., the product or packaging has somehow been tampered with. While FIG. 4 only calls out these five specific blocks of the ledger, those skilled in the art will appreciate that the ledger can include additional blocks as desired by the system designer, including blocks added by other participants in the process besides those reflected in FIG. 4.

In addition to authenticating the product ID by comparing the hash value to that stored in the blockchain ledger, the hash value can also be printed on the label on the outside of the package (again in human-readable form, machine-readable form, or both), and the printed value can be compared to the output of the smart chip.

Figure 5:
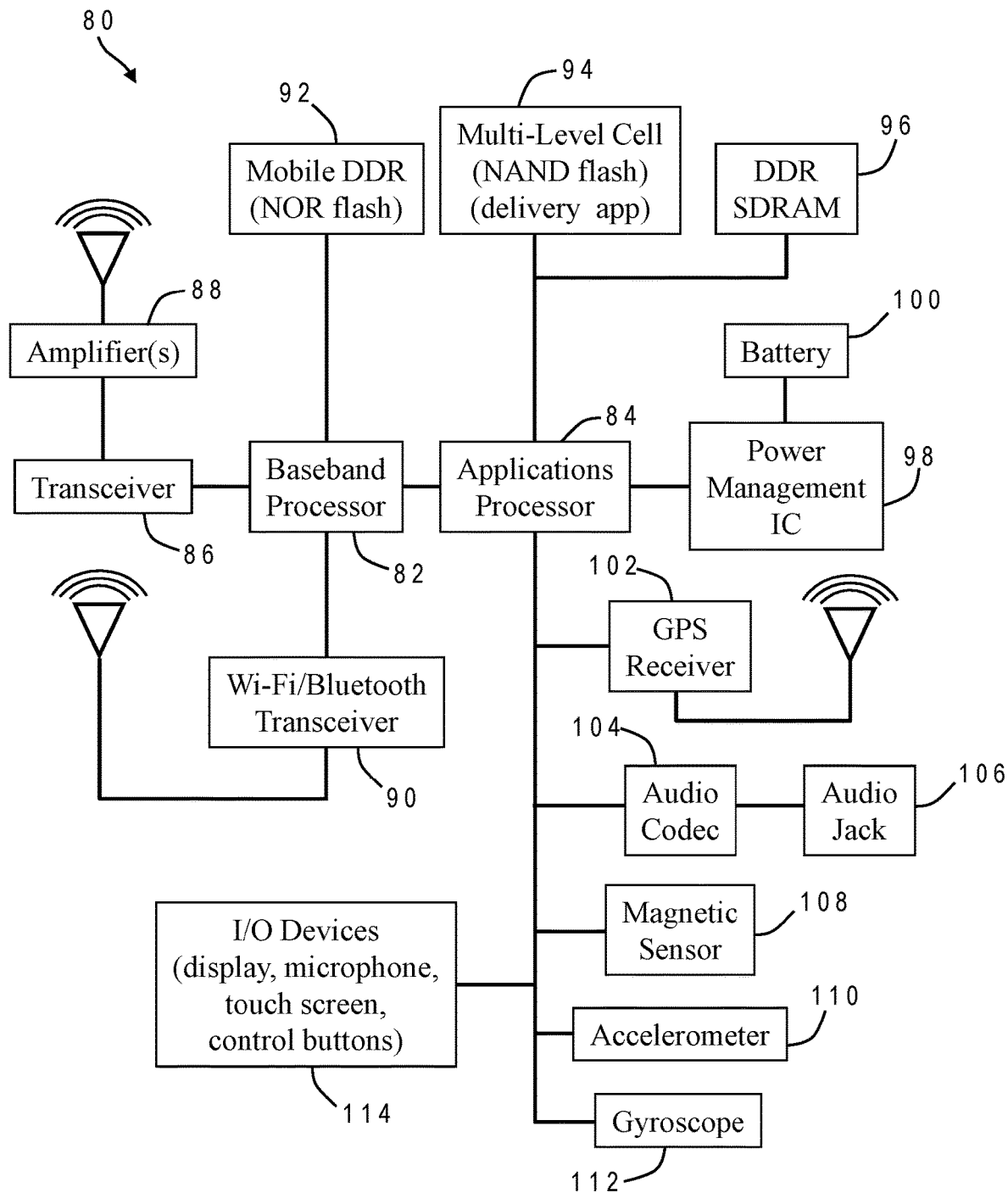
FIG. 5 is a block diagram of a mobile computing device (e.g., smartphone) programmed to carry out delivery confirmation in accordance with one implementation of the present invention.

Various devices can be used by the delivery person or the recipient to confirm proper delivery of the packaged product. For example, an app may be loaded on a recipient's cell phone to facilitate the validation. FIG. 5 illustrates one example 80 of a mobile computing device or smartphone in which aspects of at least some implementation of the present invention may be implemented to carry out validation by the user. As with computer system 20, alternative embodiments of smartphone 80 may include modifications of the hardware components or their interconnections, or additional components, and other mobile computing devices may be used besides smartphones such as tablets or notebooks, so the depicted example should not be construed as implying any architectural limitations with respect to the present invention. In this example smartphone 80 includes a baseband processor 82 and an applications processor 84. Baseband processor 82 manages most of the radio (wireless communications) functions of smartphone 80, including communication with a wireless service provider (including Internet transmissions) via a transceiver 86 which is connected by one or more power amplifiers 88 to a network antenna. Baseband processor 82 can also control Wi-Fi and Bluetooth transmissions through transceiver 90 connected to a local antenna. Baseband processor 82 uses a dedicated mobile DDR memory (NOR flash) 92.

Baseband processor 82 essentially acts as an input/output (I/O) device with respect to applications processor 84 which executes the software programs (apps) embodying the invention. Those applications may include one or more programs that can also be carried out by computer system 20. Applications processor 84 preferably utilizes multi-level cell memory (NAND flash) 94 and DDR synchronous dynamic random-access memory (SDRAM) 96. In particular, NAND flash 94 may store a delivery app of the present invention. Applications processor 84 can interact with a power management integrated circuit 98 to control the power supply (battery) 100. Applications processor 84 can additionally receive inputs from a variety of peripheral devices such as a global positioning satellite (GPS) receiver 102 connected to a GPS antenna, an audio codec 104 which drives an audio (e.g., headphone) jack 106, a magnetic sensor 108 for azimuthal indication, an accelerometer 110 for crash detection and prevention, a 3-axis gyroscope 112 for orientation indication, and user I/O devices 114 (e.g., touch screen/display, microphone and control buttons). Smartphone 80 may include many other hardware features not illustrated in FIG. 5, for example, a camera and associated driver circuitry.

When smartphone 80 is first turned on, baseband processor 82 and applications processor 84 may perform various tests such as built-in-self-tests or memory tests on the memory components 92, 94, 96. If the systems pass the tests then each processor begins execution of its primary code, namely, a communications link for baseband processor 82 and an operating system for applications processor 84. Once the network communications have been established by baseband processor 82 and the operating system is loaded by applications processor 84, the user can enter appropriate commands via the touch screen or microphone to load executable code representing embodiments of the present invention for execution by applications processor 84. Any or all of the functionalities of computer system 20 can be incorporated directly into mobile device 80 as computing power and memory storage permit.

Figure 6:
FIG. 6 is a elevational view of the smartphone of FIG. 5 showing how a package recipient can provide a quick response (QR) code to confirm proper receipt of a delivered package in accordance with one implementation of the present invention.

FIG. 6 shows how a display screen 120 of smartphone 80 might present certain information in accordance with one implementation of the present invention where smartphone 80 is used by a recipient of the delivery. In this embodiment display screen 120 is a touch screen. Display screen 120 may include various conventional features in addition to the novel features pertinent to the present invention. The conventional features may for example include one or more icons 122 at the bottom of display screen 120 with programmed functionalities.

As mentioned above, when the purchaser of the product makes the online order, they can optionally specify another code (e.g., alphanumeric and/or special characters) which is used to ensure that the person claiming to be the package recipient is actually that person. The customer then maintains this recipient code in secrecy, or gives it only to one or more alternative persons who are authorized to receive the package like neighbors or reception boxes, while the seller passes it on to the delivery service. The recipient code can be provided to the delivery app running on smartphone 80 (manually or through a seller app) which generates it as a QR code 124 (or other optically-readable code) on display screen 120. In this manner, when handing off the package to the purported recipient, the delivery person can use their own reading device (such as reader 9 from FIG. 1) to scan recipient QR code 124 and confirm that the displayed QR code matches the recipient code they got from the seller. The recipient code could be communicated from smartphone 80 by means other than optical, e.g., using a near-field communication chip. This ability to confirm proper receipt of the package is particularly valuable in guarding against the end customer or delivery company making false claims to the online store about failure to delivery, especially when combined with the contemporaneous validation of the product ID from the electronic tag and authentication of the product ID via the smart chip.

In addition to displaying recipient QR code 124 to allow validation by the delivery person, the delivery app may further facilitate validation of the delivery by the recipient. Using camera 128 of smartphone 80, the recipient can scan the QR code (product ID) on the outside of the package, and the delivery app can process that code to compare it to the product ID given to the customer via the seller. FIG. 6 shows a button 126 provided on display screen 120 as part of the delivery app user interface which may be used to initiate this validation by the user. If the QR code on the shipping label does not match the product ID provided to the recipient, the recipient can reject the package as being damaged.

If a product has a display screen included, it is straightforward for manufacturers to allow users to display the product ID and encoded value to uniquely identify the product identity against the QR code and against the transaction records. In a product that does not have a display screen, the smart chip can be used to drive a display, e.g., an LED or LCD display, and output the encoded value to that display. Optionally, buyers can activate this output and detect the encoded value using a mobile computing device and companion application to verify the output authenticity against the value provided by the manufacturer.

Figure 7:
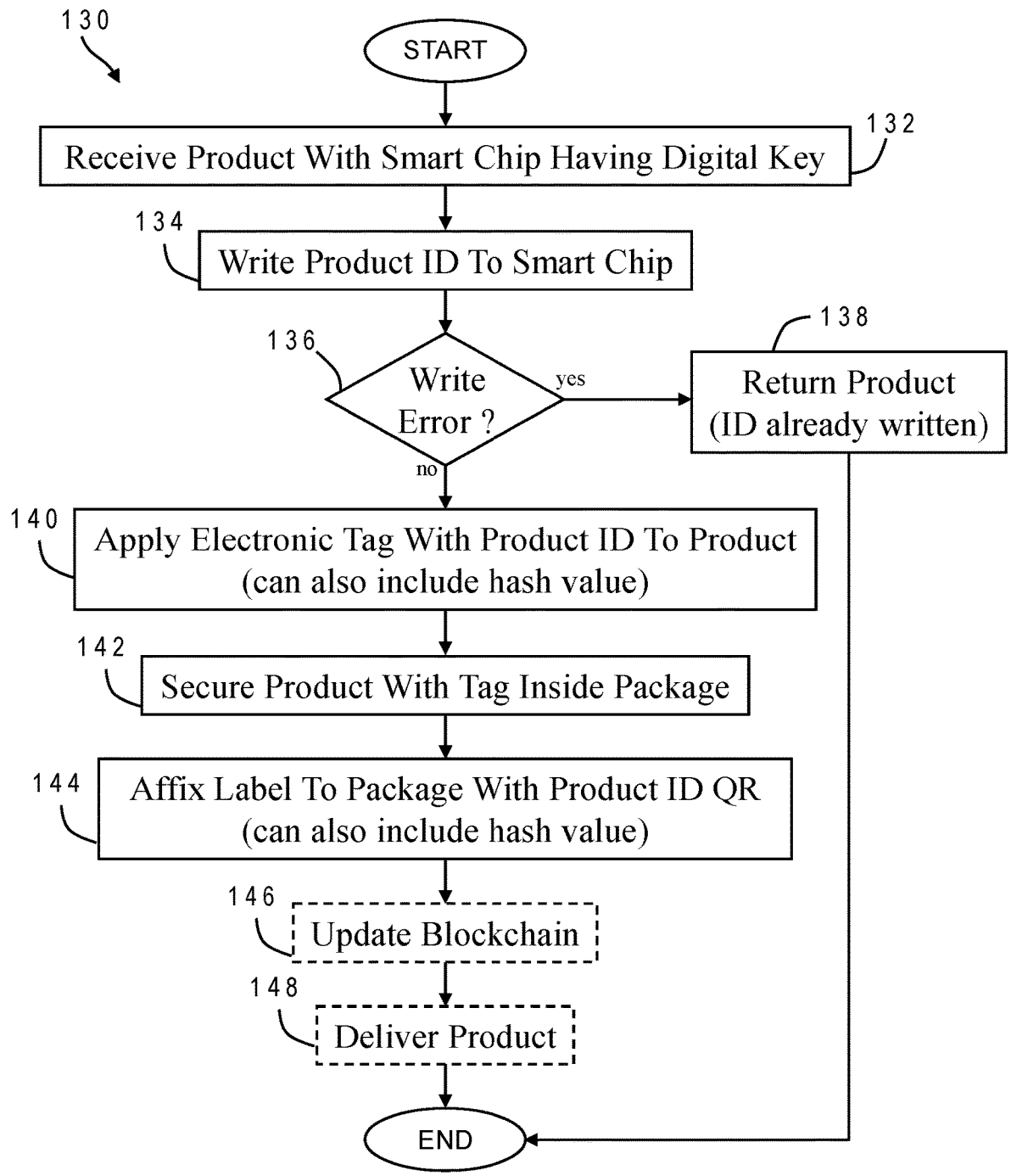
FIG. 7 is a chart illustrating the logical flow for a shipping process carried out by a manufacturer or delivery service when preparing a product for shipping in accordance with one implementation of the present invention.

Different aspects of effectuating the present invention can be practiced by different entities such as the manufacturer, the seller, the delivery service, or the recipient, so the description herein of steps carried out from one particular perspective should not be construed in a limiting sense. FIG. 7 is a chart illustrating the logical flow for a shipping preparation process 130 that could be carried out from the perspective of at least the manufacturer, the seller, or the delivery service. Process 130 begins with the product being received (132), including the smart chip having the digital key. The unique product ID is written to the smart chip (134). If there is a write error when attempting to write the product ID to the smart chip (136), it is likely because a product ID was previously written to the chip and, since the chip only allows the product ID to be written once, it is refusing any further modification of that memory cell. In such a case the product can be returned to the manufacturer or seller with an indication that the ID was already written (138). If there is no error writing the product ID to the smart chip, an electronic tag having the same product ID is attached to the product (140). In some implementations the electronic tag can also have the encoded value based on the product ID hash. The product, with the electronic tag, is placed inside the delivery package (142), and a printed label with the product ID as a QR code is affixed to the outside of the package (144). In some implementations the printed label can also have the encoded value. The package is now ready for shipping and, if a blockchain ledger for delivery of this product is being used, that ledger is updated (146). The product can then be delivered (148). The delivery step represented here might for example be handing off the package from the seller to the delivery service, or the delivery service delivery the package to the recipient destination, again depending on the perspective.

Figure 8:
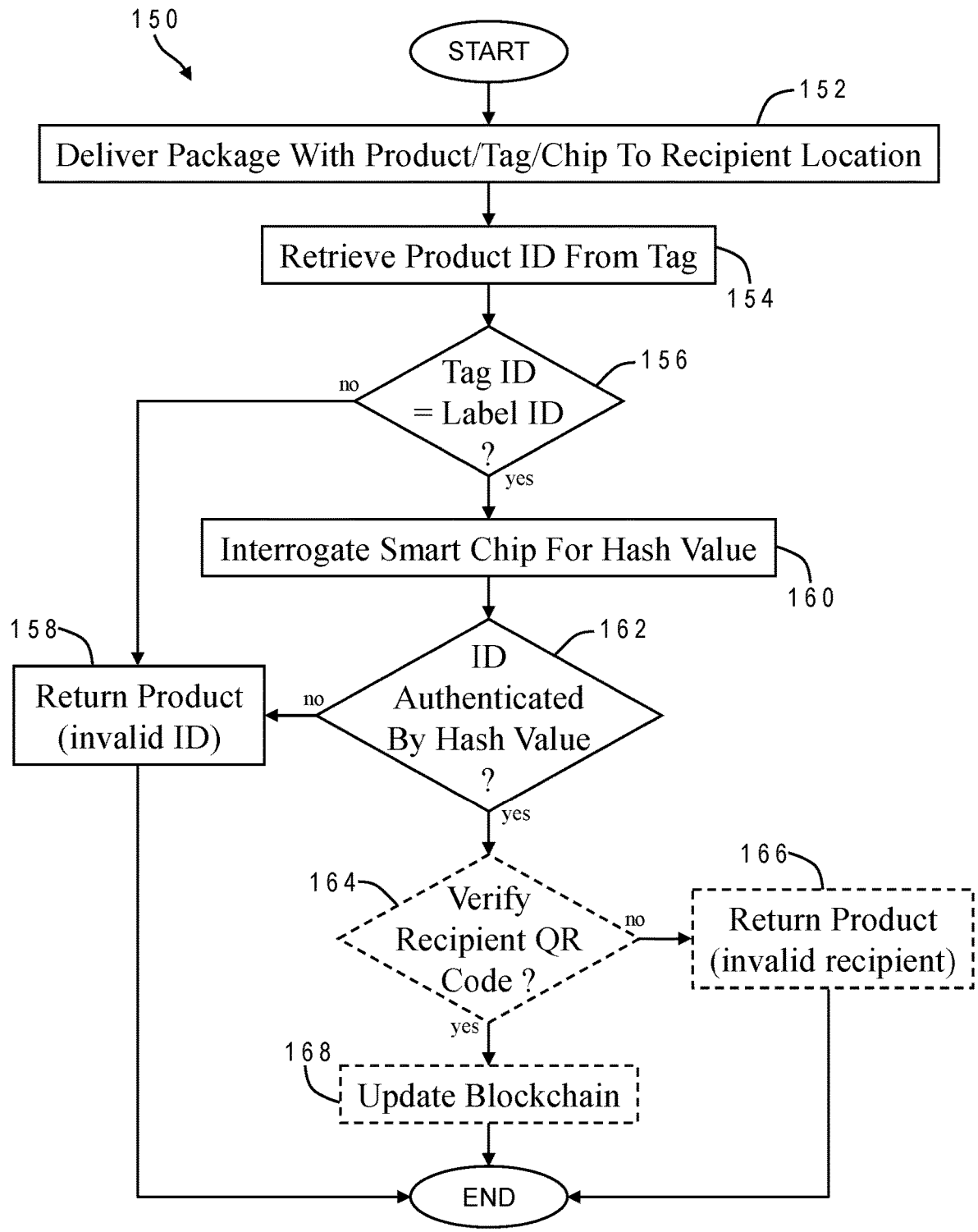
FIG. 8 is a chart illustrating the logical flow for a delivery process carried out by a delivery service when delivering a product to a recipient in accordance with one implementation of the present invention.

FIG. 8 is a chart illustrating the logical flow for a delivery process 150 from the perspective of handing off the package from the delivery service to the recipient. Process 150 begins with the delivery person bringing the packaged product to the recipient location (152). The delivery person uses a reading device to retrieve the product ID written on the electronic tag inside the package (154). The retrieved product ID is compared to the product ID as written on the printed label of the package (156). This comparison can be performed manually or by special purpose software running in the reading device as part of a delivery management program. If the two IDs are not the same, the product can be returned to the manufacturer or seller with an indication that the current ID is invalid (158). If the two IDs match, the reading device is used to interrogate the smart chip inside the product for the hash value (160). The hash value is then used to further check the authenticity of the product ID (162). The delivery person can optionally verify the recipient code if one was provided to the delivery person by the seller (164). If the recipient code does not match one provided by the recipient, the delivery person does not hand over the package but instead returns it to the seller with an indication that the recipient was invalid (166). If the recipient code is valid, the package delivery is complete. For implementations using a blockchain ledger for delivery of the product, that ledger is updated to indicate completion of delivery (168).

In this manner, the present invention provides a superior method of ensuring trustable delivery of a product. In some implementations the present invention can leverage blockchain technology to reliably track the delivery of a product from manufacturer, distributor, online store, carrier, all the way to a buyer or other intended recipient. This validation is achieved without requiring any costly equipment, and users can employ readily available tools to verify the product identity. Manufacturers can embed unique identity in the product with minimal cost overhead. On the other hand, tampering the product identity will require complex tools and procedures which greatly discourages fraudulent activity.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the context of a fairly large package, the packaged product could be as small as a thin envelope such as when a new credit card (having a smart chip) is being delivered to the end user. It is therefore contemplated that such modifications can be made without departing from the spirit or scope of the present invention as defined in the appended claims.

What is claimed is:

1. A method for enabling trustable delivery of a product comprising:
    applying an electronic tag to the product wherein the electronic tag contains a product identifier uniquely associated with the product;
    writing the product identifier to a first memory of an integrated circuit chip contained within the product, the integrated circuit chip further having a second memory which stores a digital key, wherein the integrated circuit chip prevents any change to the product identifier and the digital key, and the integrated circuit chip outputs an encoded value of the product identifier using the digital key;
    securing the product with the electronic tag inside a package; and
    affixing a label to an outside surface of the package, the label having the product identifier in visible form.

2. The method of claim 1, further comprising recording the product identifier and the encoded value in a blockchain ledger associated with the product.

3. The method of claim 1 wherein the electronic tag is a radio-frequency identification (RFID) marker.

4. The method of claim 1 wherein the encoded value is a hash function of the product identifier.

5. The method of claim 1 wherein the integrated circuit chip is assembled inside the product such that the integrated circuit chip cannot be physically accessed without breaking an exterior of the product.

6. The method of claim 1 wherein:
    the electronic tag further contains the encoded value; and
    the label further has the encoded value in visible form.

7. The method of claim 1 wherein the label has the product identifier printed in human-readable form and in machine-readable form.

8. A method for trustable delivery of a product comprising:
    delivering a package having the product therein to a location of an intended recipient, an electronic tag being applied to the product which contains a tag product identifier, an integrated circuit chip being located inside the product and having stored therein a chip product identifier and a digital key, and a label being affixed to an outside surface of the package having a label product identifier printed in visible form;
    using an electronic reader to retrieve the tag product identifier from the electronic tag;
    confirming that the tag product identifier retrieved from the electronic tag matches the label product identifier printed on the label;
    interrogating the integrated circuit chip to obtain an encoded value of the chip product identifier using the digital key; and
    authenticating the chip product identifier using the encoded value.

9. The method of claim 8 wherein said authenticating includes comparing the encoded value to a previous value recorded in a blockchain ledger associated with the product.

10. The method of claim 9 further comprising confirming that the tag product identifier matches a previous product identifier recorded in the blockchain ledger.

11. The method of claim 9 wherein said authenticating further includes comparing the encoded value to a printed value on the label.

12. The method of claim 8 wherein the electronic tag is a radio-frequency identification (RFID) marker.

13. The method of claim 8 wherein the encoded value is a hash function of the chip product identifier.

14. The method of claim 8 further comprising:
    receiving from a seller of the product a first recipient code assigned to the intended recipient of the product;
    receiving from a purported recipient of the product a second recipient code; and
    confirming that the first recipient code matches the second recipient code.

15. An article of manufacture comprising:
    a package with a printed label having a product identifier;
    a product secured inside said package, wherein the product identifier is uniquely associated with said product;
    an electronic tag applied to said product, said electronic tag containing the product identifier; and
    a smart chip located inside said product, said smart chip having a first memory cell containing the product identifier, a second memory cell containing a digital key, and processing circuitry which generates an encoded value of the product identifier using the digital key.

16. The article of claim 15 wherein the product identifier and the encoded value are recorded in a blockchain ledger associated with said product.

17. The article of claim 15 wherein said smart chip allows only a single write of the product identifier to said first memory and only a single write of the digital key to said second memory.

18. The article of claim 15 wherein the encoded value is a hash function of the product identifier.

19. The article of claim 15 wherein said label further has the encoded value.

20. The article of claim 15 wherein the electronic tag is a radio-frequency identification (RFID) marker.

* * * * *